United States Patent [19]

Magorian

[11] 3,868,686
[45] Feb. 25, 1975

[54] RANGE TRACKING DEVICE FOR A PORTABLE ATTACK WARNING RADAR

[75] Inventor: William Ray Magorian, China Lake, Calif.

[73] Assignee: The United States of America as represented by the Secretary of the Navy, Washington, D.C.

[22] Filed: Apr. 16, 1973

[21] Appl. No.: 351,726

[52] U.S. Cl. ............... 343/7 A, 343/7.5, 343/12 R, 343/17.2 R, 343/17.5
[51] Int. Cl. ............................................. G01s 9/28
[58] Field of Search ........... 343/7 A, 17.5, 17.2 PC, 343/17.1 R, 7.5, 12 R, 5 DP, 17.2 R

[56] References Cited
UNITED STATES PATENTS 3,183,506  5/1965   Webb ............................ 343/17.5
3,386,095  5/1968   Stevens .......................... 343/17.5
3,447,155  5/1969   Webb ............................ 343/17.5
3,774,206  11/1973  Rauch ............................ 343/74

Primary Examiner—T. H. Tubbesing
Assistant Examiner—G. E. Montone
Attorney, Agent, or Firm—R. S. Sciascia; Roy Miller; Robert F. Beers

[57] ABSTRACT

A range tracking device in which the range response or range resolution of a psuedo-random-noise radar is the result of the cross-correlation of a coded transmitted signal backscattered from a target with an identical code in the receiver which has been shifted in time.

3 Claims, 2 Drawing Figures

RANGE TRACKING DEVICE FOR A PORTABLE ATTACK WARNING RADAR

BACKGROUND OF THE INVENTION

1. Field of the Invention

This invention pertains to range tracking measurement devices for psuedorandom noise radar systems.

2. Description of the Prior Art

The present invention may be employed with a portable attack warning radar system. In this approach, bearing angle and range tracking information is obtained continuously (i.e., no time sharing of channels) without any movement of the antenna system. This eliminates the need for antenna drive motors and power supplies therefor. Clutter modulation by a scanning antenna beam does not occur and therefore velocity discrimination of clutter is not affected. An electronic counter measure advantage of this method results from the fact that an observer monitoring the radar is aware of only an isotropic noise radiation and cannot detect a scanning function.

SUMMARY OF THE INVENTION

The basic approach is to generate a pseudo-noise code in a digital shift register which modulates the phase of a constant wave carrier to states of either O or $\pi$ radians, depending on whether the code bit is a logical zero or one. The code generator is advanced by a free running clock which is frequency modulated in the transmit mode and frequency locked to the received signal in the receive mode.

The identical code is used to decode the received signal in three adjacent time gates. An output will occur in these gates only when the received signal has the correct carrier frequency, the correct clock frequency, the correct pseudo-noise code, and when the codes are in time synchronization.

DESCRIPTION OF THE PREFERRED EMBODIMENT

Figure 1:
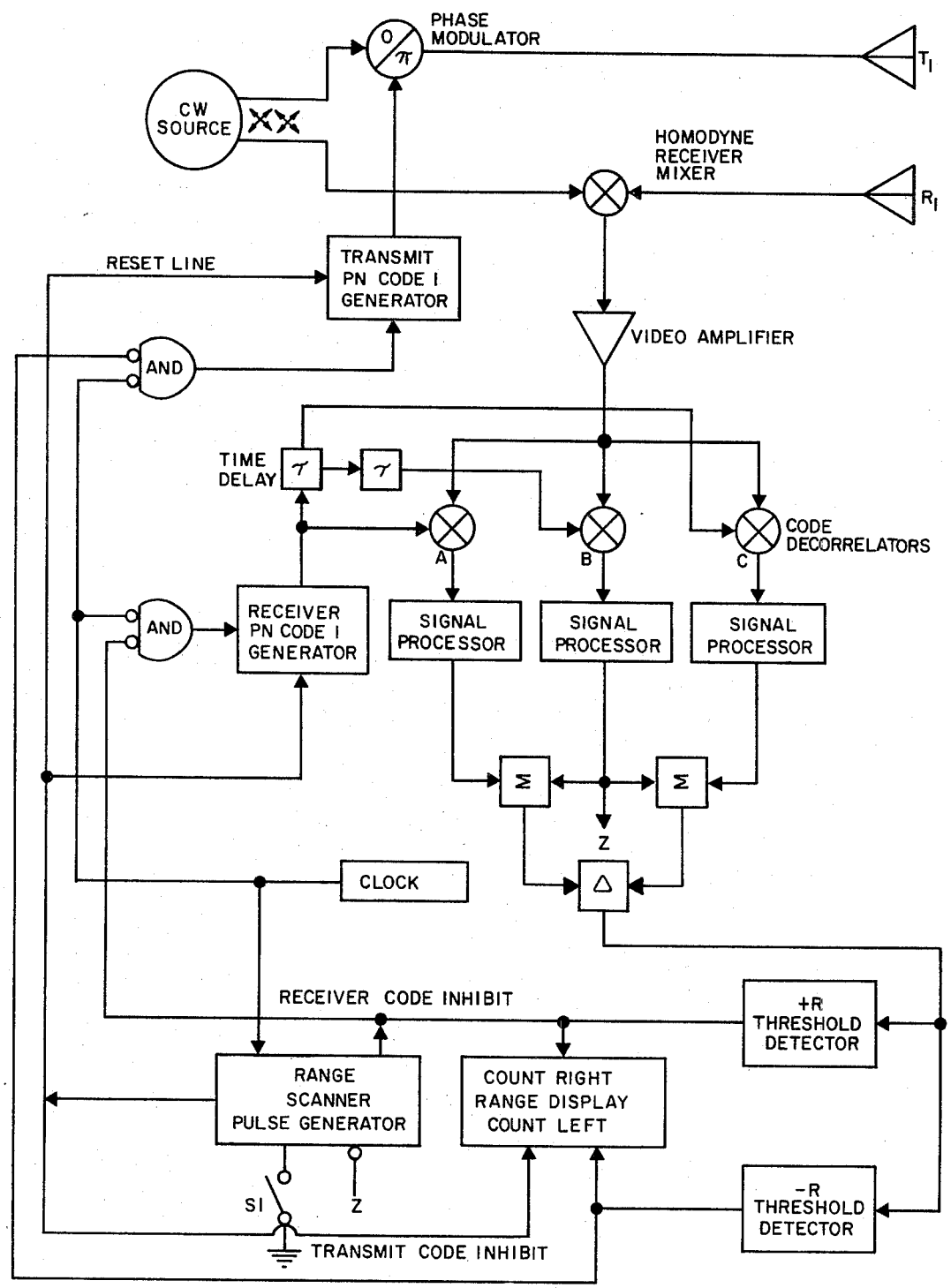
FIG. 1 is an electronic schematic of the invention.

The range response or range resolution of a pseudo-random-noise radar is the result of the cross-correlation of a coded transmitted signal back-scattered from a target with an identical code in the receiver which has been shifted in time. The resolution is related to the code bit frequency by $\Delta R = c/2(f\ bit)$ where $c$ is the velocity of light. The range at which correlation occurs depends on the time relationship between the transmit and receiver codes. $R = c\tau/2$ where $\tau$ is the time delay between codes. To provide target tracking in a portable attack warning radar, provision must be made to change the value of $\tau$ as target range changes. The basic concept is shown in FIG. 1. The constant wave source is phase shift modulated by the PN code I generator and transmitted by antenna $T_1$. An inhibit gate is inserted between the clock and the code generator.

Figure 2:
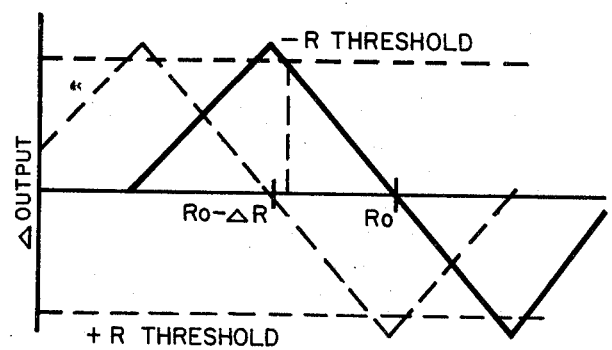
FIG. 2 shows a range discriminator produced by the sum and difference circuits.

In the receiver of antenna $R_1$, three correlators are used to derive the tracking error signal. A code generator separate from the transmit generator provides an identical code to correlator A. The same code delayed by one bit width is applied to correlator C. The code at correlator B is delayed by two bits from correlator A. The correlators are followed by signal processors which filter the target doppler, envelope detect and integrate the correlated signal. The sum and difference circuits shown produce the range discriminator curve shown as the solid line in FIG. 2. The ordinate is voltage out of the difference circuit as a function of range. The discriminator curve zero corresponds to the maximum correlation range of correlator B while the peak positive and negative voltages occur at range increments of one bit on either side of range $R_o$. Assuming a target is present at range $R_o$ and produces a voltage near zero out of the difference circuit, if the range now closes, this voltage will increase in the positive direction. When the voltage reaches the "-R threshold," this indicates the time delay between transmit and receive code generators should be decreased by one bit. When this occurs the discriminator curve is moved to the range shown by the dashed curve and the output of the difference circuit will now be slightly negative as shown.

The delay between transmit and receiver codes is obtained by clocking identical P-N generators from the same clock source but with the provision of not advancing the code in one generator relative to the other by inhibiting its clock pulses. For example, if the two generators were started in time synchronism the range of correlation would be zero. Now if 100 clock pulses were inhibited to the receiver code generator this generator would be behind the transmit generator by 100 code bits and the correlation range would move out to $$R_o = \tau\lambda/2(100).$$

The reverse would be true if a target is moving out in range. A transmit inhibit pulse will be generated when the "-R threshold" is reached which keeps the transmit code generator from advancing one bit relative to the receive generator thereby decreasing the separation between the two codes and reducing the range correlation. After each inhibit pulse occurs, several code words must be transmitted to look for target correlation before another inhibit command can occur.

In the operation of a portable attack warning radar the two generators are initially synchronized by S1 of the Range Scan pulse generator thereby setting $R_o$ to zero range. As correlation fails to occur because of lack of target signal at the correlation range, the pulse generator moves the correlation range out by inhibiting the advance of the receive code generator. If no target is present within the radar detection range the scan will continue until this maximum range is reached. The code separation will remain fixed at this range until a target enters the range cell.

The range readout is very straight forward in this system since all that is needed is a count-left - count-right digital counter. Each receive code inhibit signal advances the count of the range display by an increment equal to the range resolution and each transmit code inhibit signal reduces the count by the same amount. The target range is just the difference between the accumulated total of transmit and receiver inhibit pulses expressed in increments of range resolution.

What is claimed is:

1. A portable attack warning radar range tracking system comprising:

radio frequency carrier means for generating a carrier at a predetermined frequency;

first generating means for supplying a voltage output that varies from a maximum to a minimum voltage to form a pulsed repetitive code;

phase modulating means coupled to electrically receive an output from said first generating means and an output from said radio frequency carrier means for supplying an output signal to shift the phase of the carrier in response to the pulsed repetitive code voltage output of said first generating means;

antenna means for transmitting the output of said phase modulating means and receiving an echo return signal from a target;

second generating means for supplying a voltage output that varies from a maximum to a minimum voltage to form a pulsed repetitive code that is identical to the pulsed repetitive code output of said first generating means;

clock means coupled to said first generating means via a first gate and coupled to said second generating means via a second gate for clocking said first and second generating means in time sequence;

receiver mixer coupled to said antenna means and said radio frequency carrier means for providing an output signal representative of the target echo signal;

code decorrelator means coupled to said receiver mixer and said second generating means;

summing means coupled to said code decorrelator means for supplying a voltage output that represents the time difference between the pulsed repetitive code output of said second generating means and the pulsed repetitive code of the target echo signal coupled from said receiver mixer; and inhibit pulse generating means coupled to receive the output from said summing means for supplying inhibit signals to said first gate and to said second gate;

whereby the time difference between the pulsed repetitive code output of the second generating means and the pulsed repetitive code output from the receiver mixer is reduced to a minimum by inhibit signals to the first and the second gating means for allowing a moving target to be tracked as its range to a radar location increases and decreases.

2. The portable attack warning radar range tracking system of claim 1 wherein said code decorrelator means comprises:

a first decorrelator directly coupled to said second generating means;

a second decorrelator coupled via a first delay means to said second generating means;

a third decorrelator coupled via said first delay means and a second delay means to said second generating means.

3. A portable attack warning radar range tracking system of claim 1 wherein said inhibit pulse generating means comprises:

first detector for supplying an output whenever an output voltage from said summing means exceeds a predetermined magnitude of positive voltage level;

second detector for supplying an output whenever an output voltage from said summing means exceeds a predetermined magnitude of negative voltage level.

* * * * *